United States Patent
Sakakibara (10) Patent No.: US 9,506,760 B2
(45) Date of Patent: Nov. 29, 2016

(54) STORAGE DEVICE, NAVIGATION DEVICE, AND MAP DATABASE CREATION METHOD

(71) Applicant: DENSO CORPORATION, Kariya, Aichi-pref. (JP)

(72) Inventor: Hiroaki Sakakibara, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/411,981

(22) PCT Filed: Jul. 29, 2013

(86) PCT No.: PCT/JP2013/004581
§ 371 (c)(1),
(2) Date: Dec. 30, 2014

(87) PCT Pub. No.: WO2014/020888
PCT Pub. Date: Feb. 6, 2014

(65) Prior Publication Data
US 2015/0149082 A1 May 28, 2015

(30) Foreign Application Priority Data
Aug. 2, 2012 (JP) .................................. 2012-172229

(51) Int. Cl.
| | |
|---|---|
| G01C 21/00 | (2006.01) |
| G01C 21/34 | (2006.01) |
| G09B 29/10 | (2006.01) |
| G01C 21/32 | (2006.01) |

(52) U.S. Cl.
CPC ............ *G01C 21/00* (2013.01); *G01C 21/32* (2013.01); *G01C 21/34* (2013.01); *G09B 29/106* (2013.01)

(58) Field of Classification Search
CPC ................... G01C 21/00; G01C 21/34; G01C 21/32; G09B 29/106
USPC .......................................................... 701/461
See application file for complete search history.

(56) References Cited

U.S. PATENT DOCUMENTS 8,126,934 B2 * 2/2012 Morris ......................... 707/803
8,135,414 B2 * 3/2012 Khokhar .................... 455/456.1
(Continued)

OTHER PUBLICATIONS

International Search Report and Written Opinion of the International Search Authority mailed Oct. 15, 2013 in the corresponding PCT application No. PCT/JP2013/004581 (with English translation).

*Primary Examiner* — Rodney Butler
*Assistant Examiner* — Frederick Brushaber
(74) *Attorney, Agent, or Firm* — Posz Law Group, PLC (57) ABSTRACT

A storage device includes a map database having at least two specified sub-blocks and at least one non-specified sub-block. Each specified sub-block is correlated to a measurement position coordinate obtained from an external server by a measurement. The measurement position coordinate of each specified sub-block is stored in the storage device. The non-specified sub-block is directly or indirectly sandwiched by the two specified sub-blocks along a road. A measurement position coordinate of the non-specified sub-block is stored in the storage device when a distance between the measurement position coordinate and an estimation position coordinate of the non-specified sub-block is equal to or longer than a predetermined distance, and the measurement position coordinate of the non-specified sub-block is not stored in the storage device when the distance between the measurement position coordinate and the estimation position coordinate of the non-specified sub-block is shorter than the predetermined distance.

10 Claims, 4 Drawing Sheets

(56) References Cited

U.S. PATENT DOCUMENTS

| | | | |
|---|---|---|---|
| 8,244,456 B2* | 8/2012 | Morris | 701/300 |
| 8,655,590 B2* | 2/2014 | Geilich et al. | 701/532 |
| 2005/0034074 A1 | 2/2005 | Munson et al. | |
| 2007/0185649 A1 | 8/2007 | Geilich | |
| 2007/0296630 A1* | 12/2007 | Schwerin | 342/357.17 |
| 2008/0140311 A1 | 6/2008 | Searight et al. | |
| 2011/0160995 A1* | 6/2011 | Geilich et al. | 701/200 |

* cited by examiner

STORAGE DEVICE, NAVIGATION DEVICE, AND MAP DATABASE CREATION METHOD

CROSS REFERENCE TO RELATED APPLICATIONS

This application is a U.S. national stage application of PCT/JP2013/004581 filed on Jul. 29, 2013 and is based on Japanese Patent Application No. 2012-172229 filed on Aug. 2, 2012, the disclosures of which are incorporated herein by reference.

TECHNICAL FIELD

The present disclosure relates to a storage device storing a map database, a navigation device using the map database, and a map database creation method.

BACKGROUND ART

For example, as shown in patent literature 1, some map databases only include address points (that is, position coordinates) of a part of sub-blocks, which are included in one block (section) and arranged along a street. Herein, the address points of the partial sub-blocks may be the house numbers (that is, the sub-block numbers) of the houses located at both ends of the block along the street. In patent literature 1, a navigation device calculates, interpolates and determines position coordinates of sub-blocks that are arranged between the two sub-blocks located at both ends of the section, based on the position coordinates of the two sub-blocks located at both ends of the section. Specifically, patent literature 1 discloses that when only the sub-block 2 and the sub-block 98 have respective position coordinates, the position coordinate of the sub-block 34 is supposed to be positioned at a point of a straight line connecting the position coordinate of the sub-block 2 and the position coordinate of the sub block 98, and the point is apart from the sub-block 2 by one third as long as a distance from the sub-block 2 to the sub-block 98.

However, when the position coordinate of one sub-block is determined based on position coordinates of other sub-blocks by a proportion calculation, the position coordinate of the one sub-block calculated by the proportion calculation may have a low accuracy. Detailed reasons are described in the below. Suppose that one sub-block is sandwiched between two sub-blocks located at both ends of one section. In this case, when the position coordinate of the one sub-block is determined based on the position coordinates of the two sub-blocks located at both ends of the one section, the position coordinate of the one sub-block may be substantially different from the actual position coordinate caused by an uneven geographic arrangement of the sub-blocks.

In order to improve an accuracy of the position coordinate of each sub-block, the position coordinate (hereinafter, referred to as measurement position coordinate) of each sub-block may be measured and stored in the map database. However, when the measurement position coordinates of all of the sub-blocks on the map are stored in the map database, the map database requires extremely large data capacity for storing the position coordinates.

PRIOR ART LITERATURES

Patent Literature

[Patent literature 1] JP 2009-526273 A

SUMMARY OF INVENTION

In view of the foregoing difficulties, it is an object of the present disclosure to provide a storage device storing a map database, a navigation device using the map database, and a map database creation method, each of which reduces data capacity of the storage device that stores the map database and improves an accuracy of position coordinates of sub-blocks on an electronic map.

According to a first aspect of the present disclosure, a storage device includes a map database. The map database includes at least two specified sub-blocks and at least one non-specified sub-block. Each of the two specified sub-blocks is correlated to a measurement position coordinate obtained from an external server, and the measurement position coordinate is a position coordinate obtained by a measurement. The measurement position coordinate of each of the two specified sub-blocks is stored in the storage device. The non-specified sub-block is directly or indirectly sandwiched by the two specified sub-blocks along a road. The storage device stores a measurement position coordinate of the non-specified sub-block when a distance between the measurement position coordinate of the non-specified sub-block and an estimation position coordinate of the non-specified sub-block is equal to or longer than a predetermined distance. The measurement position coordinate of the non-specified sub-block is obtained from the external server, and the estimation position coordinate of the non-specified sub-block is calculated by a proportion calculation based on the measurement position coordinates of the two specified sub-block. The storage device does not store the measurement position coordinate of the non-specified sub-block when the distance between the measurement position coordinate of the non-specified sub-block and the estimation position coordinate of the non-specified sub-block is shorter than the predetermined distance.

With the above storage device, data capacity of the storage device that stores the map database can be reduced and an accuracy of position coordinates of sub-blocks on an electronic map can be improved.

According to a second aspect of the present disclosure, a navigation device determines a position coordinate of an object sub-block based on measurement position coordinates stored in the map database according to the first aspect. Herein, the map database is stored in the storage device. The navigation device includes an existence determination section, a position coordinate estimation section, and a position coordinate determination section. The existence determination section determines whether the measurement position coordinate of the object sub-block is stored in the map database. The position coordinate estimation section calculates the position coordinate of the object sub-block by a proportion calculation based on the measurement position coordinates of the two specified sub-blocks positioned along the road. The object sub-block is directly or indirectly sandwiched between the two specified sub-blocks. The position coordinate determination section determines the measurement position coordinate of the object sub-block as the position of the coordinate of the object sub-block when the existence determination section determines that the measurement position coordinate of the object sub-block is stored in the map database. The position coordinate determination section further determines the estimation position coordinate of the object sub-block as the position coordinate of the object sub-block when the existence determination section determines that the measurement position coordinate of the object sub-block is not stored in the map database.

With the above navigation device, when determining a position coordinate of an object sub-block, accuracy of the position coordinate of the object sub-block can be improved.

According to a third aspect of the present disclosure, a map database creation method includes: storing measurement position coordinates of at least two specified sub-blocks provided by an external server, the measurement position coordinates of the two specified sub-blocks being obtained by a measurement, the two specified sub-blocks being included in an island-shaped area on an electronic map and the island-shaped area further including a plurality of non-specified sub-blocks positioned along a road, the non-specified sub-blocks being sandwiched by the two specified sub-blocks that are positioned on respective ends of the island-shaped area along the road; calculating an estimation position coordinate of each of the non-specified sub-blocks by a proportion calculation based on the measurement position coordinates of the two specified sub-blocks; when a distance between an estimation position coordinate of an object sub-block and a measurement position coordinate of the object sub-block is equal to or longer than a predetermined distance, storing the measurement position coordinate of the object sub-block as the position coordinate of the object sub-block, the object sub-block being one of the non-specified sub-blocks, the estimation position coordinate of the object sub-block being calculated by the proportion calculation and the measurement position coordinate of the object sub-block being obtained from the external server; and when the distance between the estimation position coordinate of the object sub-block and the measurement position coordinate of the object sub-block is shorter than the predetermined distance, skipping the storing of the measurement position coordinate of the object sub-block.

With the above method, data capacity of the storage device that stores the map database can be reduced and an accuracy of position coordinates of sub-blocks on an electronic map can be improved.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
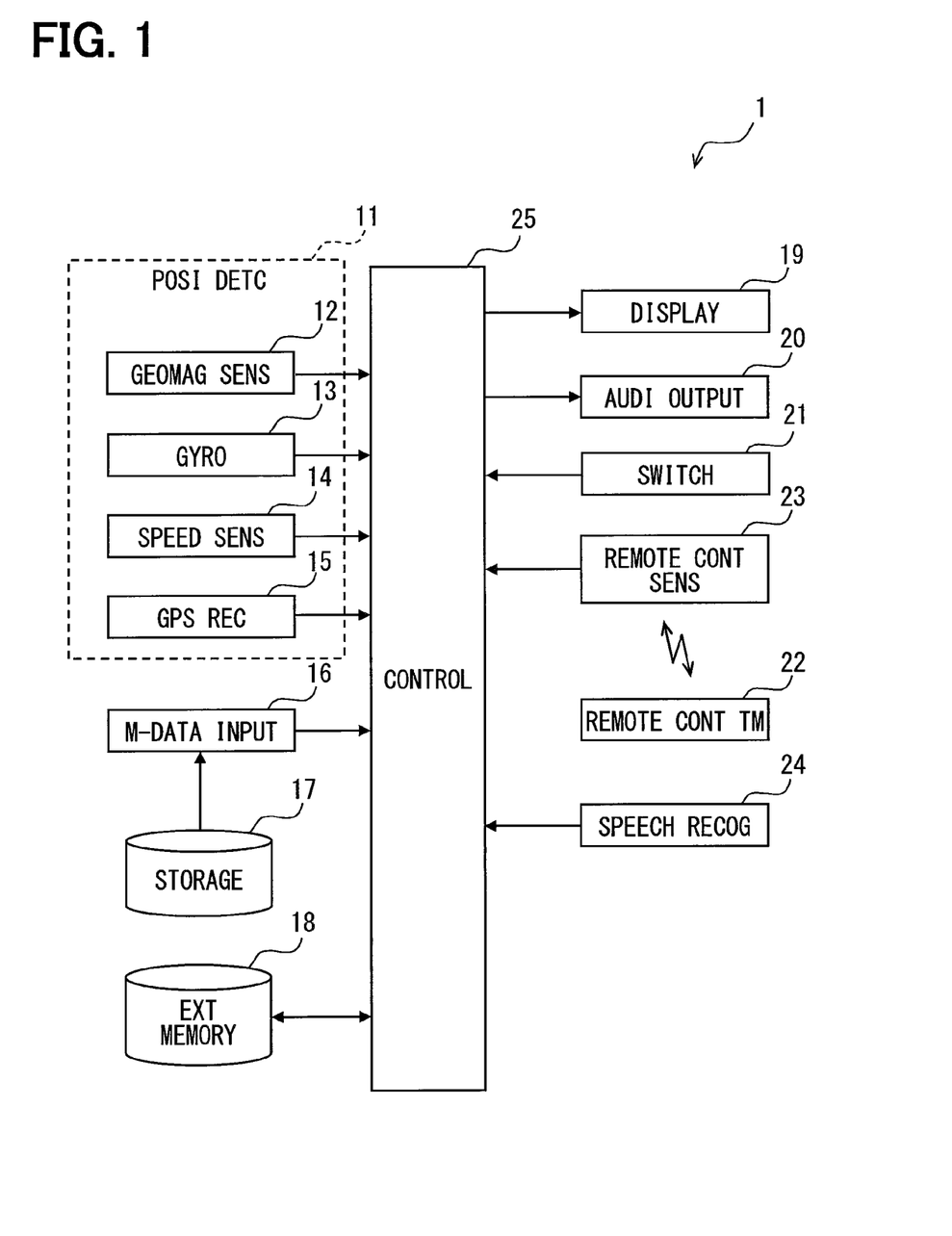
FIG. 1 is a block diagram showing a configuration of a navigation device according to an embodiment of the present disclosure.

The following will describe embodiments of the present disclosure with reference to the drawings. As shown in FIG. 1, a navigation apparatus 1 is equipped to, for example, a vehicle, and has a navigating function, such as retrieving a route and giving instructions to the retrieved route. As shown in FIG. 1, the navigation device 1 includes a position detector (POSI DETC) 11, a map data input unit (M-DATA INPUT) 16, a storage (STORAGE) 17, an external memory (EXT MEMORY) 18, a display device (DISPLAY) 19, an audio output unit (AUDI OUTPUT) 20, a manipulation switch group (SWITCH) 21, a remote control terminal (REMOTE CONT TM) 22, a remote control terminal sensor (REMOTE CONT SENT) 23, a speech recognition unit (SPEECH RECOG) 24, and a controller (CONTROL) 25.

The position detector 11 includes a well-known geomagnetic sensor (GEOMAG SENS) 12, a gyroscope (GYRO) 13, a speed sensor (SPEED SENS) 14 that calculates a vehicle speed, and a GPS receiver (GPS REC) 15 used in a global positioning system (GPS) for detecting a position of the vehicle based on radio waves from a satellite. Each of the geomagnetic sensor 12, the gyroscope 13, the speed sensor 14, and the GPS receiver 15 included in the position detector 11 has an instrumental error different from each other. Thus, the multiple sensors included in the position detector 11 may be used in a complementary manner. The speed sensor 14 may function as a distance sensor. Alternatively, the position detector 11 may include a part of the above-described sensors based on an accuracy of each sensor.

The map data input unit 16 inputs, to the controller 25, map data necessary for drawing of the electronic map. The map data includes road data having node data and link data, background data indicating a landform, and text data indicating a name of a place. The map data input unit 6 is connected with the storage 17 that stores the map data. The storage 17 may be provided by a Compact Disc Read Only Memory (CD-ROM), a Digital Versatile Disk Read Only Memory (DVD-ROM), a memory card, a Hard Disk Drive (HDD) or the like. A map database including the above-described map data may be stored in the storage 17, and the storage 17 may function as a storage device.

The link connects adjacent nodes when a road on the electronic map is divided by nodes, such as an intersection, a branch point, and/or a join point. The link data includes a link ID, which is a predetermined number for identifying a link, a link length indicating a length of a link, a link direction, a link azimuth, coordinates (latitude and longitude) of a link start and a link end, or the like. The link is also referred to as a road segment.

The node data includes a node ID, which is a predetermined number assigned to a node, a node coordinate, a node name, a connection link ID that is an ID of a link connected to the node, or the like.

The storage 17 stores position coordinates of a part of the sub-blocks included in one block on the electronic map. Specifically, for a part of the sub-blocks, the storage 17 stores a position coordinate (latitude and longitude) of a representative point of each sub-block as the position coordinate of the corresponding sub-block. Each sub-block has a predetermined sub-block number for specifying the corresponding sub-block. The sub-block number is also referred to as a house number. The sub-block number of each sub-block is correlated to a position coordinate that is stored in an external server. The position coordinates (hereinafter, referred to as a measurement position coordinate) stored in the external server are obtained by a measurement. For example, the measurement position coordinate may be an ITRF coordinate defined based on International Terrestrial Reference Frames (ITRF).

For example, the storage 17 stores measurement position coordinates of at least two sub-blocks located at both ends of an island-shaped area (hereinafter, referred to as a block) positioned along a road (street). In the block, the sub-blocks are arranged along the street. The sub-blocks may be assigned with consecutive integer numbers, or may be assigned with consecutive odd or even numbers. The block may include two rows of sub-blocks that are arranged along the street. Alternatively, the block may include one row of sub-blocks that are arranged along the street. When the block includes two rows of sub-blocks that are arranged along the street, the sub-blocks arranged in each row along the street are assigned with consecutive integer numbers or assigned with consecutive odd or even numbers. Suppose that the block includes two rows of sub-blocks that are arranged along the street. In this case, among the sub-blocks in each row, the measurement position coordinates of at least two sub-blocks located at both ends of each row are stored in the storage 17.

In the following description of the present disclosure, the block is supposed to include one row of sub-blocks that are arranged along the street for description convenience. In this case, among the sub-blocks that are arranged in one row and configure the block, the measurement position coordinates of the two sub-blocks located at two ends of the block are stored in the storage 17. That is the measurement position coordinate of the sub-block (hereinafter, referred to as a start sub-block) having a minimum sub-block number and the measurement position coordinate of the sub-block (hereinafter, referred to as a terminal sub-block) having a maximum sub-block number are stored in the storage 17. In the present embodiment, a measurement position coordinate of a start end node of the road link along which the start sub-block and the terminal sub-blocks are arranged is set as the measurement position coordinate of the start sub-block. Similarly, a measurement position coordinate of a terminal end node of the road link along which the start sub-block and the terminal sub-blocks are arranged is set as the measurement position coordinate of the terminal sub-block.

When the block includes two rows of sub-blocks that are arranged along the road, in each row of the sub-blocks, the measurement position coordinates of the start sub-block and the terminal sub-block are stored in the storage 17. The start sub-block and the terminal sub-block are also referred to as specified sub-blocks, and the sub-blocks sandwiched between the start sub-block and the terminal sub-block are also referred to as non-specified sub-blocks.

The measurement position coordinates of the sub-blocks sandwiched by the start sub-block and the terminal sub-block are stored in the storage 17 when a predetermined condition is satisfied. The measurement position coordinates of the sub-blocks sandwiched by the start sub-block and the terminal sub-block are not stored in the storage 17 when the predetermined condition is not satisfied. The predetermined condition will be described later in detail. The following will describe a method of storing map data to the storage 17 with reference to FIG. 2(a) to FIG. 2(c). Storing of the map data to the storage 17 may be performed during a product manufacturing process of the storage 17. For example, the storing of the map data to the storage 17 may be performed before the storage 17 is equipped to the map data input unit 16.

In the following description, suppose that the sub-blocks having the sub-block numbers of "1","3","5","7","9" are arranged in a direction (hereinafter, referred to as a first direction) from the start end node to the terminal end node along the road link, and the sub-blocks having the sub-block numbers of "10","8","6","4","2" are arranged in a direction (hereinafter, referred to as a second direction) from the terminal end node to the start end node along the road link.

Figure 2A:
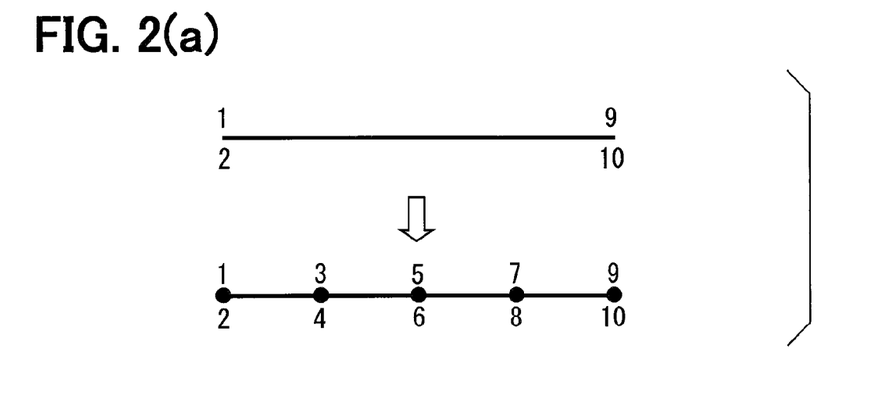
FIG. 2(a) to FIG. 2(c) are diagrams showing a method for storing map data in a storage medium.

As shown in FIG. 2(a), based on the measurement position coordinates of the start end node (START) and the terminal end node (END) of the road link along which the start sub-block and the terminal sub-block are located, the position coordinates of the sub-blocks sandwiched by the start sub-block and the terminal sub-block are estimated by a proportion calculation. Specifically, the position coordinates of the sub-blocks sandwiched by the start sub-block and the terminal sub-block are estimated based on the measurement position coordinates of the start sub-block and the terminal sub-block under an assumed condition that each sub-block from the terminal sub-block to the start sub-block has the same dimension with one another.

As a specific example of the proportion calculation, for the sub-blocks arranged in the first direction, unit latitude and unit longitude are obtained by dividing latitude and longitude difference obtained by subtracting latitude and longitude of the measurement position coordinate of the start sub-block from latitude and longitude of the measurement position coordinate of the terminal sub-block by a sub-block number difference of "8" obtained by subtracting the sub-block number of the start sub-block "1" from the sub-block number of the terminal sub-block "9". Then, the sub-block number of the start sub-block "1" is subtracted from the sub-block number of a target sub-bock (herein, assume that the sub-block number of the target sub-block is "3"), and a sub-block number difference of "2" is obtained. Then, the sub-block number difference of "2" is multiplied with the unit latitude and unit longitude calculated above, and added to the latitude and longitude of the measurement position coordinate of the start sub-block for obtaining the latitude and longitude of the position coordinate of the target sub-block having the sub-block number of "3". That is, the position coordinate of each sub-block sandwiched by the start sub-block and the terminal sub-block is equally divided based on the measurement position coordinates of the start sub-block and the terminal sub-block.

Figure 2B:
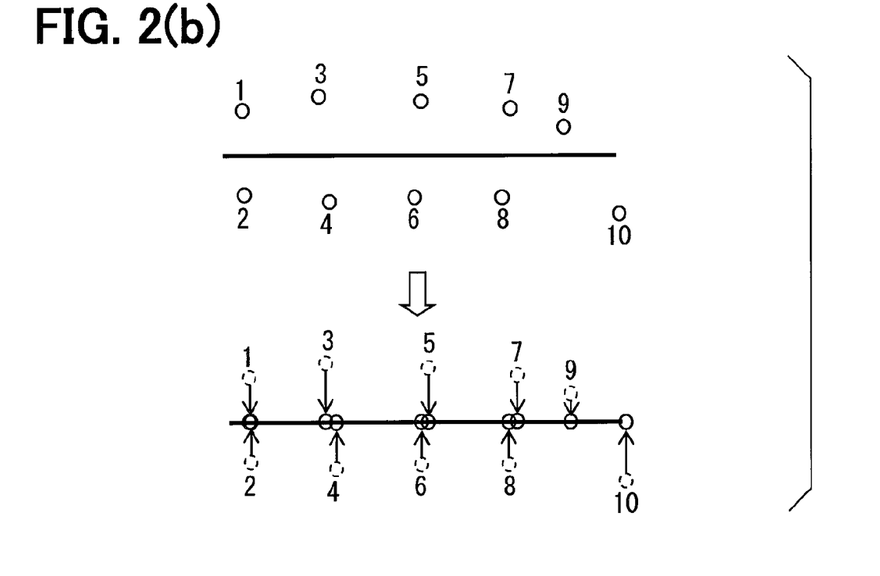
Figure 2C:
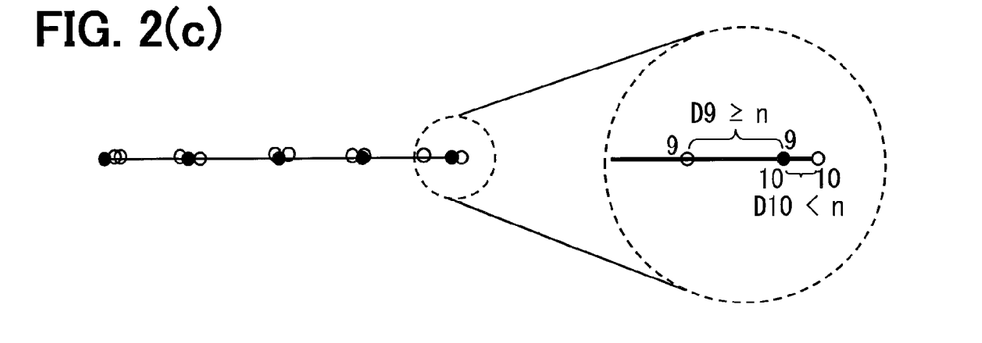

In the second direction, the proportion calculation similar to the above-described proportion calculation may be carried out for calculating the position coordinate of the sub-block sandwiched between the start sub-block and the terminal sub-block. With above-described proportion calculation, the position coordinates of all of the sub-blocks sandwiched between the start sub-block and the terminal sub-block are estimated (refer to FIG. 2(a)). The estimated position coordinates (hereinafter, also referred to as estimation position coordinate) of the sub-blocks sandwiched between the start sub-block and the terminal sub-block are also referred to as potential addresses. In FIG. 2(a) to FIG. 2(c), solid circles indicate the potential addresses.

For example, all of the measurement position coordinates of the sub-blocks from the start sub-block to the terminal sub-block may be acquired from an external server provided by a government. Then, as shown in FIG. 2(b), the measurement position coordinates of the sub-blocks from the start sub-block to the terminal sub-block are projected on a straight line indicating a link of the road along which the sub-blocks are arranged on the electronic map. Then, a coordinate of each intersection at which the straight line intersects with a line passing through each sub-block and perpendicular to the straight line is calculated. Herein, suppose that each measurement position coordinate of each sub-block from the start sub-block to the terminal sub-block provided by the government is located apart from the road link. Hereinafter, the coordinate of the intersection on the road link is also referred to as a pinpoint address. In FIG. 2(a) to FIG. 2(c), open circles indicate the pinpoint addresses.

As shown in FIG. 2(c), for each sub-block from the start sub-block to the terminal sub-block, a difference between the potential address and the pinpoint address is calculated. As an example, a straight-line distance (D9, D10) between the potential address and the corresponding pinpoint address is calculated. When the straight-line distance (for example, D9) is equal to or longer than a predetermined distance n (unit: meter), the measurement position coordinate provided by the government is stored in the storage 17 for the corresponding sub-block. When the straight-line distance (for example, D10) is shorter than the predetermined distance n, the measurement position coordinate provided by the government is not stored in the storage 17 for the corresponding sub-block. That is, when a predetermined condition that the straight-line distance between the potential address and the pinpoint address is equal to or longer than the predetermined distance n is satisfied, the measurement position coordinate of the sub-block acquired from the external server is stored in the storage 17. When the predetermined condition that the straight-line distance between the potential address and the pinpoint address is equal to or longer than the predetermined distance n is not satisfied, the measurement position coordinate of the sub-block acquired from the external server is not stored in the storage 17. The non-specified sub-block that satisfies the predetermined condition is also referred to as a first non-specified sub-block, and the non-specified sub-block that does not satisfy the predetermined condition is also referred to as a second non-specified sub-block.

When storing the measurement position coordinates provided by the external server of government in the storage 17, the pinpoint address may be stored or the measurement position coordinate for calculating the pinpoint address can be stored in the storage 17.

In the present embodiment, the predetermined distance n is a fixed predetermined value regardless of a maximum capacity of a memory region of the storage 17 for storing the measurement position coordinates. Hereinafter, for simplification purpose, the memory region of the storage 17 for storing the measurement position coordinates is also referred to as a memory region.

First Modification

The predetermined distance n may be determined according to the maximum capacity of the memory region of the storage 17 for storing the measurement position coordinates. The following will describe an example in which the predetermined distance n is set according to the maximum capacity of the memory region as a first modification.

Figure 3:
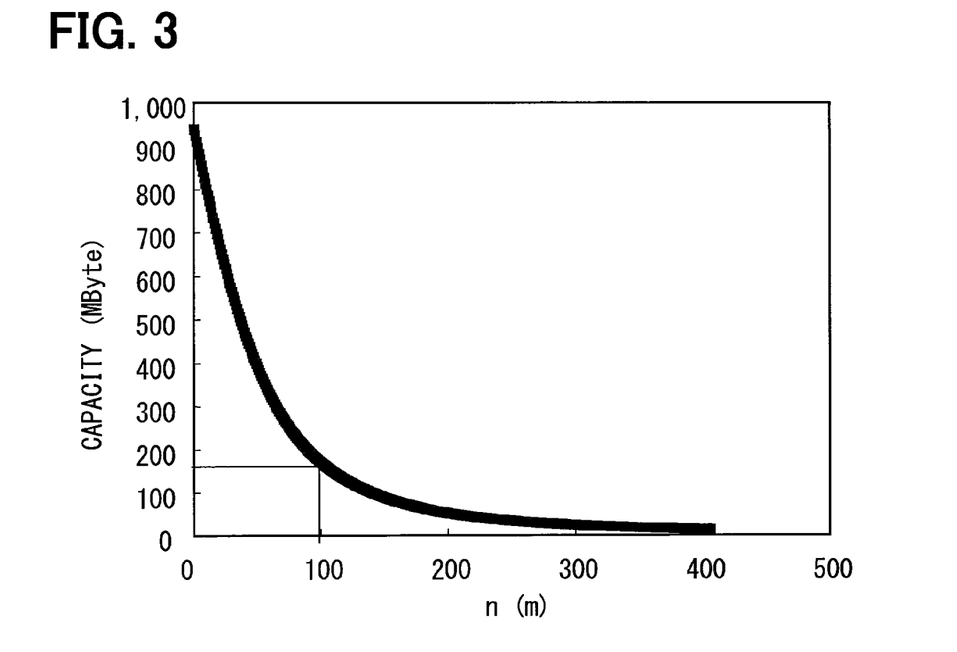
FIG. 3 is a diagram showing a relation between a maximum capacity of a memory region and a predetermined distance.

Suppose that the predetermined distance n and the necessary memory capacity for storing the measurement position coordinates are in a proportional relation as shown in FIG. 3. In FIG. 3, a vertical axis indicates the memory capacity (CAPACITY) necessary for storing the measurement position coordinates, and a horizontal axis indicates the predetermined distance n. In FIG. 3, a unit of the memory capacity is Megabyte, and a unit of the predetermined distance n is meter.

Figure 4:
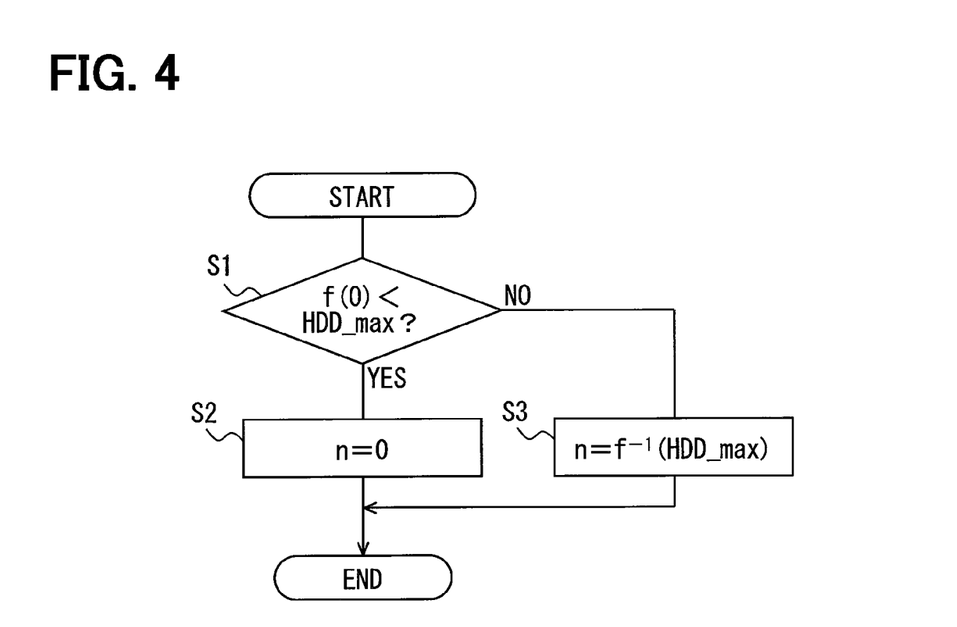
FIG. 4 is a flowchart showing a process for determining a predetermined distance according to a maximum capacity of a memory region.

The following will describe an example in which the predetermined distance n is determined corresponding to the maximum capacity of the memory region with a flowchart shown in FIG. 4. The process shown in FIG. 4 is executed by an arithmetic unit provided by a computer, which is not shown.

At S1, the arithmetic unit determines whether an arithmetic result of f(0) is smaller than the maximum capacity (herein, represented by HDD_max) of the memory region. Herein, f(n) is a function indicating a graph shown in FIG. 4. The function f(n) is used for calculating a value on the vertical axis, herein n indicates a value on the horizontal axis. Thus, at S1, the memory capacity necessary for storing the measurement position coordinates is calculated, and the calculated necessary memory capacity is determined whether to be smaller than the maximum capacity HDD_max of the storage 17.

When the value of f(0) is smaller than the maximum capacity HDD_max (S1: YES), the process proceeds to S2. When the value of f(0) is equal to or greater than the maximum capacity HDD_max (S1: NO), the process proceeds to S3.

In a case where the capacity of the memory region necessary for storing the measurement position coordinates is determined to be smaller than the maximum capacity HDD_max when the predetermined distance n is equal to zero, at S2, the predetermined distance n is set to zero (n=0) and the process is ended.

In a case where the capacity of the memory region necessary for storing the measurement position coordinates is determined to be greater than the maximum capacity HDD_max when the predetermined distance n is equal to zero, at S3, the predetermined distance n is newly determined. Specifically, the predetermined distance n is determined so that the capacity of the memory region for storing the measurement position coordinates corresponding to the newly determined predetermined distance n is smaller than the maximum capacity HDD_max.

Specifically, the predetermined distance n is decreased corresponding to an increase of the maximum capacity of the memory region for storing the measurement position coordinates. As an example, at S3, a value calculated by f−1(HDD_max) is set as the predetermined distance n, and the process is ended. Herein, f−1(S) is an inverse function of f(n), and calculates the predetermined distance n based on the value (S) on the horizontal axis shown in FIG. 3.

With the configuration in the first modification, the predetermined distance n that suppresses the memory capacity necessary for storing the measurement position coordinates smaller than the maximum capacity HDD_max can be determined.

The external memory 18 is provided by a writable large-capacity device, such as a HDD. The external memory 18 is able to store large amounts of data, and the data are maintained in the external memory 18 even when the external memory 18 is powered off. The external memory 18 also copies frequently used data from the map data input unit 16, and uses the copied data. The external memory 18 may also be provided by a removable memory that has a relatively small capacity.

The display device 19 is provided by a display screen that displays an electronic map for guiding a travelling of the vehicle, a destination selection window and the like. For example, the display device 19 may be provided by a display screen that supports a color display, such as a liquid crystal display screen, an organic EL display screen, plasma display screen and the like. The audio output unit 20 is provided by a speaker, and outputs, based on an instruction of the controller 25, an audio guidance during the route guidance.

The operation switch group 21 includes, as an example, a touch switch that is integrated with the display device 19, or a mechanical switch. An instruction for executing each function to the controller 25 is carried by operating the operation switch group 21. The operation switch group 21 includes a switch for setting a departure point and a destination. By operating the switch for setting the departure point and the destination, the user is able to set the departure point and the destination based on preliminarily registered places, names of facilities, phone numbers, and addresses.

The remote control terminal 22 includes multiple operation switches (not shown). When the switches are operated, the remote control terminal 22 inputs an instruction signal to the controller 25 by the remote control terminal sensor 23. Thus, the remote control terminal 22 is able to instruct the controller 25 to execute the functions, similar to the operation switch group 21.

The speech recognition unit 24 recognizes a speech made by the user and input to a microphone, and outputs a control command to the controller 25 corresponding to the recognized speech. The controller 25 executes a process corresponding to the control command output by the speech recognition unit 24.

The controller 25 is provided by a general purpose computer, and includes a well-known central processing unit (CPU), a read only memory (ROM), a random access memory (RAM), a memory, an Input/Output (I/O), and a bus line that connects the above-described parts (the parts of the controller are not shown in the drawings). The controller 25 execute various processes, such as a navigation process, based on various informations transmitted from the position detector 11, the map data input unit 16, the external memory 18, the operation switch group 21, the remote control terminal sensor 23, and the speech recognition unit 24.

Figure 5:
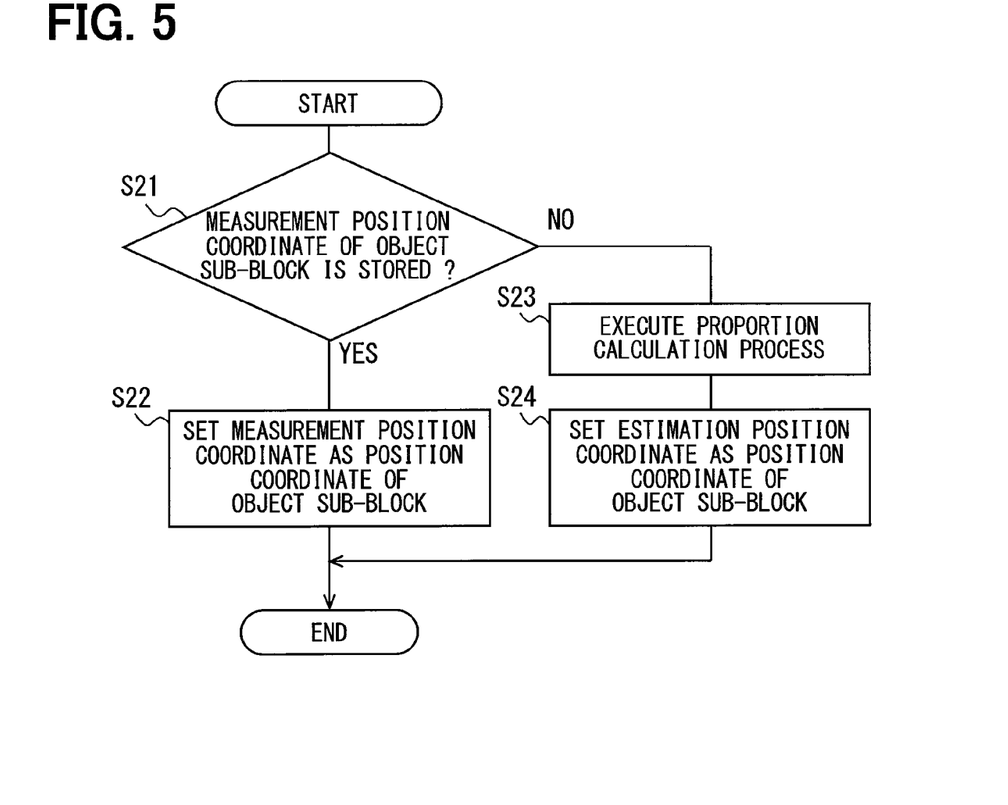
FIG. 5 is a flowchart showing an exemplary process executed by a controller for determining a position coordinate of an object sub-block.

The following will describe an exemplary process executed by the controller 25 for determining the position coordinate of the target sub-block (hereinafter, also referred to as an object sub-block) with reference to a flowchart shown in FIG. 5. For example, this process is executed when the target sub-block (that is, the object sub-block) is searched for or selected as a destination.

At S21, the controller 25 determines whether the measurement position coordinate of the object sub-block is stored in the storage 17 or not. The process executed at S21 corresponds to an existence determination section. When the measurement position coordinate of the object sub-block is stored in the storage 17 (S21: YES), the controller 25 proceeds to S22. When the measurement position coordinate of the object sub-block is not stored in the storage 17 (S21: NO), the controller 25 proceeds to S23.

At S22, the controller 25 sets the measurement position coordinate of the object sub-block stored in the storage 17 as the position coordinate of the object sub-block. The process executed at S22 corresponds to a position coordinate determination section. When displaying a mark indicating the position of the object sub-block on a display window of the display device 19, the latitude and longitude of the measurement position coordinate of the object sub-block are displayed corresponding to the x coordinate and y coordinate on the display window, respectively.

At S23, the controller 25 executes a proportion calculation process, and proceeds to S24. In the proportion calculation process, the position coordinate of the object sub-block is estimated based on the measurement position coordinates of the start sub-block and the terminal sub-block. Herein, the object sub-block may be sandwiched directly in a contacted manner along the road or may be sandwiched indirectly in a non-contacted manner by the start sub-block and the terminal sub-block along the road. In the proportion calculation process, the position coordinate of each sub-block sandwiched between the start sub-block and the terminal sub-block is calculated as described above.

Suppose that the sub-block number of the start sub-block is "1", the sub-block number of the terminal sub-block is "99", and the sub-block number of the object sub-block is "49" in an exemplary case. In this case, unit latitude and unit longitude are obtained are obtained by dividing latitude and longitude difference obtained by subtracting latitude and longitude of the measurement position coordinate of the start sub-block from latitude and longitude of the measurement position coordinate of the terminal sub-block by a sub-block number difference of "98" obtained by subtracting the sub-block number of the start sub-block "1" from the sub-block number of the terminal sub-block "99". Then, the sub-block number "1" of the start sub-block is subtracted from the sub-block number "49" of the object sub-bock and a difference of the sub-block number "48" is obtained. Then, the sub-block number difference of "48" is multiplied with the unit latitude and unit longitude calculated before, and the unit latitude and unit longitude multiplied by "48" are added to the latitude and longitude of the measurement position coordinate of the start sub-block for obtaining the latitude and longitude of the position coordinate of the object sub-block having the sub-block number of "49". The process executed at S23 corresponds to a position coordinate estimation section.

At S24, the position coordinate (that is, the estimation position coordinate) estimated by the proportion calculation process is set as the position coordinate of the object sub-block, and the process is ended. The process executed at S24 corresponds to a position coordinate determination section. When displaying a mark indicating the position of the object sub-block on a display window of the display device 19, the latitude and longitude of the estimation position coordinate of the object sub-block are displayed corresponding to the x coordinate and y coordinate on the display window, respectively.

In the present embodiment, for one object sub-block, when the difference between the estimation position coordinate and the measurement position coordinate is equal to or greater than the predetermined distance n, the measurement position coordinate of the object sub-block is stored in the storage 17 as the position coordinate. That is, when the estimation position coordinate of the object sub-block, which is calculated by the proportion calculation, has a relatively low accuracy, the measurement position coordinate of the object sub-block is stored in the storage 17 as the position coordinate.

Figure 6:
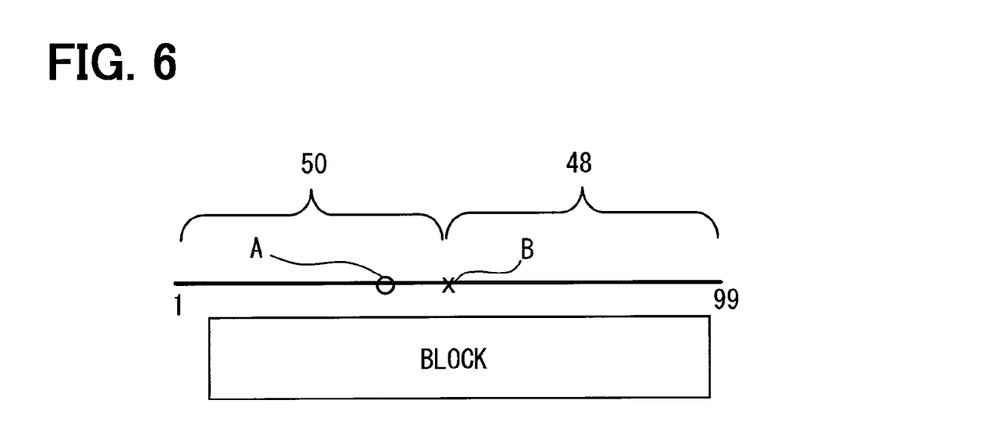
FIG. 6 is a diagram showing an example in which an estimation position coordinate having a low accuracy is calculated by a proportion calculation.

The following will describe an example in which the estimation position coordinate having a relatively low accuracy is calculated by the proportion calculation for the sub-block. In this example, suppose that the sub-block number of the start sub-block is "1", the sub-block number of the terminal sub-block is "99", and the sub-block number of the object sub-block is "51". In FIG. 6, A indicates the actual position coordinate (that is, measurement position coordinate) of the object sub-block having the sub-block number of "51", and B indicates the estimation position coordinate of the object sub-block.

When calculating the position coordinate of the object sub-block having the sub-block number of "51" by the proportion calculation, the position coordinate of a point at which a distance difference between the start sub-block "1" and the terminal sub-block "99" is divided by a ratio of 50 to 48 is approximately equal to the measurement position coordinate of the object sub-block under an assumption that each sub-block included in the block has equal dimension. When the dimension of each sub-block included in the block has different dimensions, the position coordinate of the point at which the distance difference between the start sub-block "1" and the terminal sub-block "99" is divided by the ratio of 50 to 48 may be greatly different from the measurement position coordinate of the object sub-block.

In the present embodiment, when the estimation position coordinate of the object sub-block, which is calculated by the proportion calculation, has a relatively low accuracy, the measurement position coordinate of the object sub-block is stored in the storage 17. Thus, even when the estimation position coordinate of the object sub-block has a relatively low accuracy, an accuracy of the position coordinate of the object sub-block can be improved by setting the measurement position coordinate as the position coordinate of the object sub-block.

In the present embodiment, for the object sub-block whose estimation position coordinate is different from the measurement position coordinate and the difference is smaller than the predetermined distance n, that is, for the object sub-block whose estimation position coordinate has a relatively high accuracy, the measurement position coordinate of the object sub-block is not stored in the storage 17 as the position coordinate of the object sub-block. Thus, data amount of the storage 17 can be reduced while securing an accuracy of the position coordinate of the object sub-block.

In the navigation device 1, when the measurement position coordinate of the object sub-block is stored in the storage 17, the navigation device 1 sets the measurement position coordinate stored in the storage 17 as the position coordinate of the object sub-block. Thus, the position coordinate having a higher accuracy can be set for the object sub-block. On the other hand, when the measurement position coordinate of the object sub-block is not stored in the storage 17, the navigation device 1 sets the estimation position coordinate as the position coordinate of the object sub-block. Thus, the position coordinate having a higher accuracy can be set for the object sub-block.

Second Modification

In the foregoing embodiments, the map database is stored in the storage 17. Alternatively, the map database may be stored in other devices. For example, according to the second modification of the present embodiment, the map database may be stored in a memory included in the navigation device 1, such as the external memory 18. Thus, the external memory 18 may also function as a storage device.

In the foregoing embodiments, the map database is applied to the navigation device equipped to a vehicle. As another example, the map database may also be applied to a mobile terminal having a GPS function.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A map database storage device for a navigation apparatus of a vehicle, the map database storage device comprising:
a processor; and
a map database storage coupled to the processor, the map database storage storing therein a map database, wherein
the map database includes a plurality of link data of a plurality of links that correspond to a plurality of roads, and each of the plurality of links connects two adjacent nodes,
the map database includes at least two specified sub-blocks and at least one non-specified sub-block,
each of the two specified sub-blocks is correlated to a measurement position coordinate obtained from an external source, the measurement position coordinate is a position coordinate obtained by a measurement,
the map database further includes (i) the measurement position coordinate of each of the two specified sub-blocks, and (ii) the plurality of link data for specifying a position coordinate of the non-specified sub-block, the plurality of link data and the measurement position coordinates are stored in different storage locations from each other in the map database,
the non-specified sub-block is directly or indirectly sandwiched by the two specified sub-blocks along one of the plurality of roads,
the processor is configured to
store, in the map database storage, a measurement position coordinate of the non-specified sub-block when a distance between the measurement position coordinate of the non-specified sub-block and an estimation position coordinate of the non-specified sub-block is determined to be equal to or longer than a predetermined distance, the measurement position coordinate of the non-specified sub-block is obtained from the external source and the estimation position coordinate of the non-specified sub-block is calculated by a proportion calculation based on the measurement position coordinates of the two specified sub-block, and
not store, in the map database storage, the measurement position coordinate of the non-specified sub-block when the distance between the measurement position coordinate of the non-specified sub-block and the estimation position coordinate of the non-specified sub-block is determined to be shorter than the predetermined distance.

2. The map database storage device according to claim 1, wherein, in an island-shaped area, which is an area having an island shape and includes the sub-blocks positioned along the road, the two specified sub-blocks are positioned at respective ends of the island-shaped area.

3. The map database storage device according to claim 1, wherein
the processor is further configured to determine the predetermined distance based on a maximum capacity of a memory region of the map database storage for storing the measurement position coordinate of each of the two specified sub-blocks and the non-specified sub-block, and the predetermined distance decreases with an increase of the maximum capacity of the memory region.

4. A navigation device determining a position coordinate of an object sub-block based on measurement position coordinates stored in a map database of a map database storage device, wherein the map database of the map database storage device includes:
- a plurality of link data of a plurality of links that correspond to a plurality of roads, and each of the plurality of links connects two adjacent nodes,
- at least two specified sub-blocks and at least one non-specified sub-block;
- each of the two specified sub-blocks is correlated to a measurement position coordinate obtained from an external source, the measurement position coordinate is a position coordinate obtained by a measurement;
- the map database further includes (i) the measurement position coordinate of each of the two specified sub-blocks, and (ii) the plurality of link data for specifying a position coordinate of the non-specified sub-block, the plurality of link data and the measurement position coordinates are stored in different storage locations from each other in the map database;
- the non-specified sub-block is directly or indirectly sandwiched by the two specified sub-blocks along one of the plurality of roads;
- the map database storage stores a measurement position coordinate of the non-specified sub-block when a distance between the measurement position coordinate of the non-specified sub-block and an estimation position coordinate of the non-specified sub-block is determined to be equal to or longer than a predetermined distance, the measurement position coordinate of the non-specified sub-block is obtained from the external source and the estimation position coordinate of the non-specified sub-block is calculated by a proportion calculation based on the measurement position coordinates of the two specified sub-block; and
- the map database storage does not store the measurement position coordinate of the non-specified sub-block when the distance between the measurement position coordinate of the non-specified sub-block and the estimation position coordinate of the non-specified sub-block is determined to be shorter than the predetermined distance, the navigation device comprising:
a processor cooperative with the map database storage, the processor is configured to
- determine, in an existence determination section, whether the measurement position coordinate of the object sub-block is stored in the map database;
- calculate, in a position coordinate estimation section, the position coordinate of the object sub-block by a proportion calculation based on the measurement position coordinates of the two specified sub-blocks positioned along the road, the object sub-block being sandwiched between the two specified sub-blocks in a contacted manner or in a non-contacted manner; and
- determine, in a position coordinate determination section, the measurement position coordinate of the object sub-block as the position coordinate of the object sub-block when the existence determination section determines that the measurement position coordinate of the object sub-block is stored in the map database, and the position coordinate determination section further determines the estimation position coordinate of the object sub-block as the position coordinate of the object sub-block when the existence determination section determines that the measurement position coordinate of the object sub-block is not stored in the map database.

5. The navigation device according to claim 4, further comprising
the map database storage that stores the map database.

6. The navigation device according to claim 4, wherein the processor is further configured to,
for an island-shaped area, which is an area having an island shape and includes the sub-blocks positioned along the road, position the two specified sub-blocks at respective ends of the island-shaped area.

7. The navigation device according to claim 4, wherein the processor is further configured to
determine the predetermined distance based on a maximum capacity of a memory region of the map database storage for storing the measurement position coordinate of each of the two specified sub-blocks and the non-specified sub-block, and the predetermined distance decreases with an increase of the maximum capacity of the memory region.

8. A map database creation method to create a map database for a navigation apparatus of a vehicle, comprising:
- storing, by a processor, in a map database stored on a map database storage device, (i) measurement position coordinates of at least two specified sub-blocks, and (ii) a plurality of link data of a plurality of links that correspond to a plurality of roads, the plurality of link data and the measurement position coordinates are stored in different storage locations from each other in the map database, each of the plurality of links connecting two adjacent nodes, the measurement position coordinates being provided by an external source and being obtained by a measurement, the two specified sub-blocks being included in an island-shaped area on an electronic map and the island-shaped area further including a plurality of non-specified sub-blocks positioned along one of a plurality of roads, the non-specified sub-blocks being sandwiched by the two specified sub-blocks that are positioned on respective ends of the island-shaped area along the one of the plurality of roads, the measurement position coordinates of the at least two specified sub-blocks being used for specifying a position coordinate of each of the plurality of non-specified sub-blocks;
- calculating, by the processor, an estimation position coordinate of each of the non-specified sub-blocks by a proportion calculation based on the measurement position coordinates of the two specified sub-blocks;
- when a distance between an estimation position coordinate of an object sub-block and a measurement position coordinate of the object sub-block is determined to be equal to or longer than a predetermined distance, storing, by the processor, in the map database stored on the map database storage, the measurement position coordinate of the object sub-block as the position coordinate of the object sub-block, the object sub-block being one of the non-specified sub-blocks, the estimation position coordinate of the object sub-block being calculated by the proportion calculation and the measurement position coordinate of the object sub-block being obtained from the external source; and
- when the distance between the estimation position coordinate of the object sub-block and the measurement position coordinate of the object sub-block is determined to be shorter than the predetermined distance, skipping the storing of the measurement position coordinate of the object sub-block.

9. The map database creation method according to claim 8, further comprising
positioning, by the processor, for an island-shaped area, which is an area having an island shape and includes the sub-blocks positioned along the road, the two specified sub-blocks at respective ends of the island-shaped area.

10. The map database creation method according to claim 8, further comprising
determining, by the processor, the predetermined distance based on a maximum capacity of a memory region of the map database storage for storing the measurement position coordinate of each of the two specified sub-blocks and the non-specified sub-block, and the predetermined distance decreases with an increase of the maximum capacity of the memory region.

\* \* \* \* \*